United States Patent [19]
van Hoff

[11] Patent Number: 5,758,361
[45] Date of Patent: May 26, 1998

[54] DOCUMENT EDITOR FOR LINEAR AND SPACE EFFICIENT REPRESENTATION OF HIERARCHICAL DOCUMENTS

[75] Inventor: Arthur A. van Hoff, Mountain View, Calif.

[73] Assignee: Sun Microsystems, Inc., Mountain View, Calif.

[21] Appl. No.: 619,126

[22] Filed: Mar. 20, 1996

[51] Int. Cl.$^6$ .................................................. G06F 12/00
[52] U.S. Cl. ........................ 707/513; 707/101; 707/514
[58] Field of Search ........................ 395/772, 773, 395/774, 776, 779, 609, 615, 762; 707/511, 512, 513, 514, 517, 501, 10, 101, 102, 104

[56] References Cited

U.S. PATENT DOCUMENTS

| | | | |
|---|---|---|---|
| 5,113,341 | 5/1992 | Kozol et al. | 395/793 |
| 5,347,632 | 9/1994 | Filepp et al. | 395/200.32 |
| 5,432,897 | 7/1995 | Tatsumi et al. | 395/140 |
| 5,506,985 | 4/1996 | Motoyama et al. | 395/612 |
| 5,587,902 | 12/1996 | Kugimiya | 395/752 |
| 5,644,776 | 7/1997 | DeRose et al. | 395/761 |
| 5,649,218 | 7/1997 | Saito | 395/774 |
| 5,655,130 | 8/1997 | Dodge et al. | 395/772 |
| 5,659,729 | 8/1997 | Nielsen | 395/603 |

OTHER PUBLICATIONS

Ken Thompson, "Regular Expression Search Algorithm." *Communications of the ACM*, Jun. 1968, vol. 11, No. 6, pp. 419–422.

Kin–Man Chung and Herbert Yuen, "A 'Tiny' Pascal Compiler; Part 1: The P-Code Interpreter." *BYTE Publications, Inc.*, Sep. 1978.

Kin–Man Chung and Herbert Yuen, "A 'Tiny' Pascal Compiler; Part 2: The P-Compiler." *BYTE Publications, Inc.*, Oct. 1978.

Gene McDaniel, "An Analysis of a Mesa Instruction Set." *Association for Computing Machinery*, May 1982.

Kenneth A. Pier, "A Retrospective on the Dorado, A High-Performance Personel Computer." *IEEE Computer Society, 10th Annual Intl. Symposium on Computer Architecture*, 1983, pp. 252–269.

*Primary Examiner*—Phu K. Nguyen
*Assistant Examiner*—Stephen Hong
*Attorney, Agent, or Firm*—Gary S. Williams; Flehr Hohbach Test Albritton & Herbert LLP

[57] ABSTRACT

A computer system and method edits a hierarchical document that has starttags and endtags and leaf contents between ones of the starttags and endtags. The computer system includes a memory, a user interface, and a hierarchical document editor. The memory stores a data structure representing the hierarchical document. The data structure includes an array of items and a corresponding index and a corresponding index offset for each of the items. Each of the items represents a corresponding one of the starttags, endtags, and leaf contents. The user interface displays the hierarchical document. It also issues commands for editing the hierarchical document. The hierarchical document editor edits the hierarchical document in response to the issued commands by traversing ones of the items in the data structure based on the indexes and index offsets of the traversed ones of the items.

15 Claims, 2 Drawing Sheets

DOCUMENT EDITOR FOR LINEAR AND SPACE EFFICIENT REPRESENTATION OF HIERARCHICAL DOCUMENTS

The present invention relates to the representation of hierarchical documents, such as Hypertext Markup Language (HTML) documents, by hierarchical document editors. In particular, the present invention pertains to an editor that represents hierarchical documents in a linear and space efficient manner for display and editing.

BACKGROUND OF THE INVENTION

The World Wide Web (WWW) makes documents (i.e., Web pages) available to Internet users. These documents may contain text, graphical images, video images, audio sounds, and even executable programs. Moreover, these documents may contain links to other documents on the WWW. In order that Web documents may contain links to other Web documents, they are written in HTML.

A hierarchical HTML document comprises numerous nested components that together form a tree. Each nested component is identified by a starttag and a corresponding (or matching) endtag. The starttags and endtags form the branches of the tree. The contents between the starttags and endtags that are not starttags or endtags, such as text strings or single (or empty) tags, form the leaves of the tree.

Conventional HTML document editors represent an HTML document simply as trees in a data structure with starttag, endtag, and leaf items respectively corresponding to the starttags, endtags, and leaf contents of the HTML document. As a result, in editing the HTML document, these HTML document editors must traverse not only the starttag and endtag items of the HTML document, but also all of the elements of the leaf items. This unfortunately makes the editing process complex, cumbersome, and slow.

SUMMARY OF THE INVENTION

In summary, the present invention is a computer system and method for representing and editing hierarchical documents. The hierarchical document comprises starttags and endtags and leaf contents between ones of the starttags and endtags. The computer system comprises a memory, a user interface, and an hierarchical document editor.

The memory stores a data structure representing the hierarchical document. The data structure comprises an array of items and a corresponding index and a corresponding index offset for each of the items. Each of the items represents a corresponding one of the starttags, endtags, and leaf contents. The user interface displays the HTML document. It also issues commands for editing the HTML document. The HTML editor edits the HTML document in response to the issued commands by traversing ones of the items in the data structure based on the indexes and index offsets of the traversed ones of the items.

BRIEF DESCRIPTION OF THE DRAWINGS

Additional goals and features of the invention will be more readily apparent from the following detailed description and appended claims when taken in conjunction with the drawings, in which:

DESCRIPTION OF THE PREFERRED EMBODIMENTS

Figure 1:
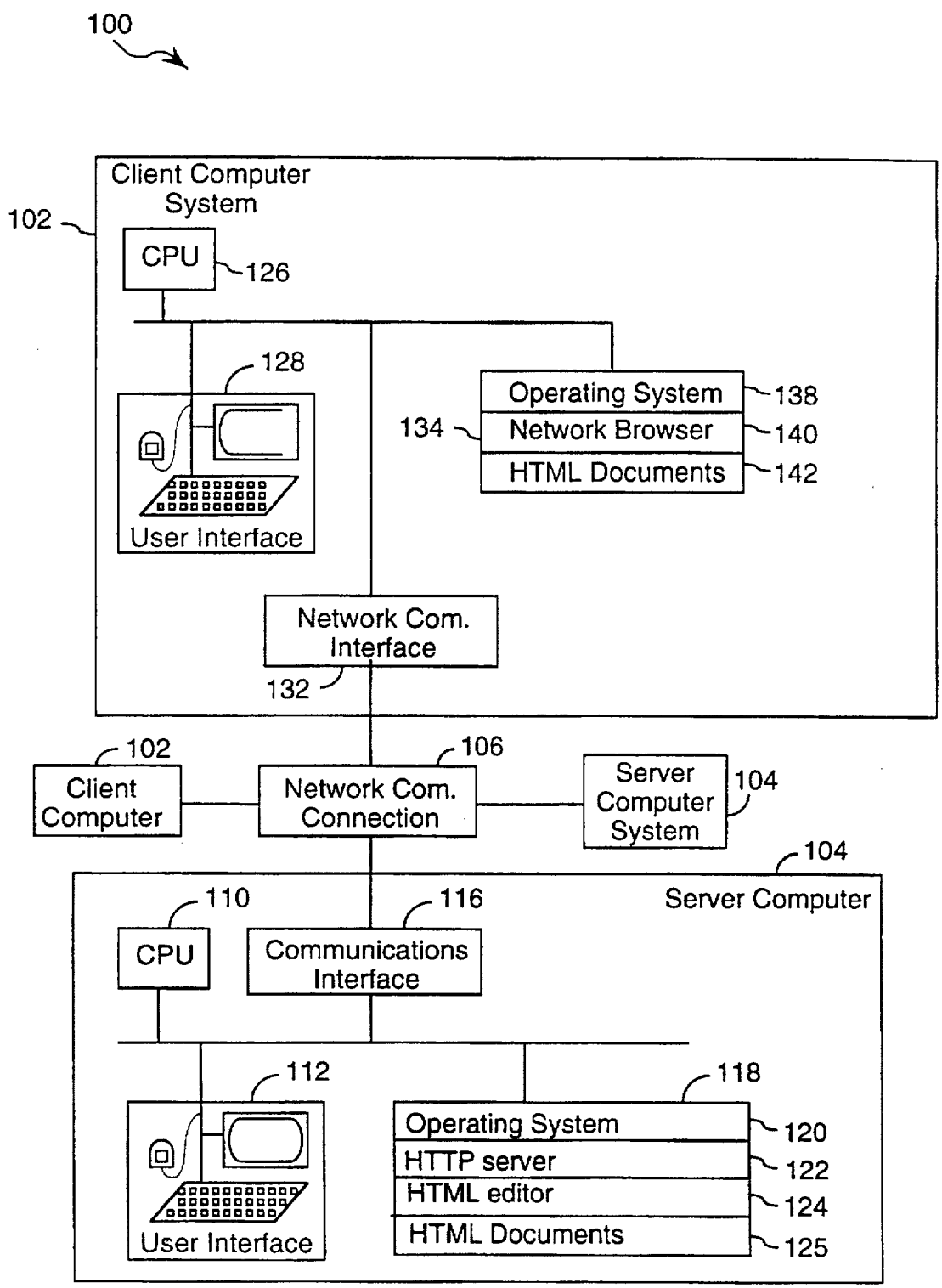
FIG. 1 is a block diagram of a computer network incorporating the hierarchical document editor of the present invention.

Referring to FIG. 1, there is shown a computer network 100 in accordance with the present invention. It includes one or more client computer systems 102, one or more server computer systems 104, and a network communications connection 106.

The client computer systems 102 are connected to the server computer systems 104 via the network communications connection 106. The network communications connection may be a local or wide area network, the Internet, or some other type of network communications connection.

Each server computer system 104 includes a central processing unit (CPU) 110, a user interface 112, a network communications interface 116, and a memory 118. The network communications interface enables each server computer system to communicate with the client computer systems 102 via the network communications connection 106.

The memory 118 of each server computer system 104 stores an operating system 120, a Hypertext Transport Protocol (HTTP) server 122, a hierarchical document editor 124, and documents 125 for downloading to the client computer systems 102. In the preferred embodiment, the hierarchical document editor 124 is an HTML document editor and the documents 125 are HTML documents. However, in other embodiments of the present invention, other forms of hierarchically structured documents may be used with corresponding hierarchical document editors.

The operating system, HTTP server, and HTML document editor 124 are run on the CPU 110. The operating system controls and coordinates running of the HTTP server 122 and HTML document editor 124 in response to commands issued by a user with the user interface 112 or messages received by the network communications interface 116 via the network communications connection 106 from users of the client computer systems 102.

As will be explained in greater detail later, the HTML document editor 124 is used to create and edit the HTML documents 125. Moreover, the HTTP server is used to download the HTML document editor 124 as well as HTML documents 125 to the client computer systems 102.

Each client computer system 102 includes a central processing unit (CPU) 126, a user interface 128, a network communications interface 132, and a memory 134. The network communications interface enables the client computer system to communicate with the server computer system 104 via the network communications connection 106.

The memory 134 of each client computer system 102 stores an operating system 138, a network browser (or communications manager) 140, and HTML documents 142 downloaded from the server computer system 104. Furthermore, the network browser 140 incorporates a copy or version of the hierarchical document editor 124.

The operating system and network browser are executed on the CPU 126. The operating system controls and coordinates execution of the network browser in response to commands issued by a user with the user interface 128. In the preferred embodiment, the network browser is a HotJava (a trademark of Sun Microsystems) browser.

As alluded to earlier, an HTML document 125 of a server computer system 104 is downloaded to a user's client computer system 102 when a user requests it. This occurs when the user issues commands with the user interface 128 to invoke the network browser 140 and download the HTML document. In response, the operating system 120 calls the network browser 140 which generates a message indicating that such a request has been made. The network communications interface 132 then transmits the message to the server computer system.

The network communications interface 116 of the server computer system 104 receives the transmitted message. In response, the HTTP server 122 of the server computer system handles the message and provides the requested HTML document 125 to the network communications interface. The network communications interface then transmits the HTML document using the proper HTTP protocol to the user's client computer system 102.

The transmitted HTML document 125 is received by the network communications interface 132 of the user's client computer system 102. In response, the network browser 140 then loads the HTML document in the memory 134 as one of the HTML documents 142 and displays it on the user interface 128. Since the displayed HTML document may include HTML links to other HTML documents of the server computer systems 104, the user may download these HTML documents in the manner just described by issuing an appropriate command with the user interface.

As mentioned earlier, in order to create and edit an HTML document 125 for display by the client computer systems 102, the server computer system 104 includes an HTML document editor 124. In addition, the client computer systems 102 also include the HTML document editor for the purpose of creating and modifying hierarchical HTML documents.

Figure 2:
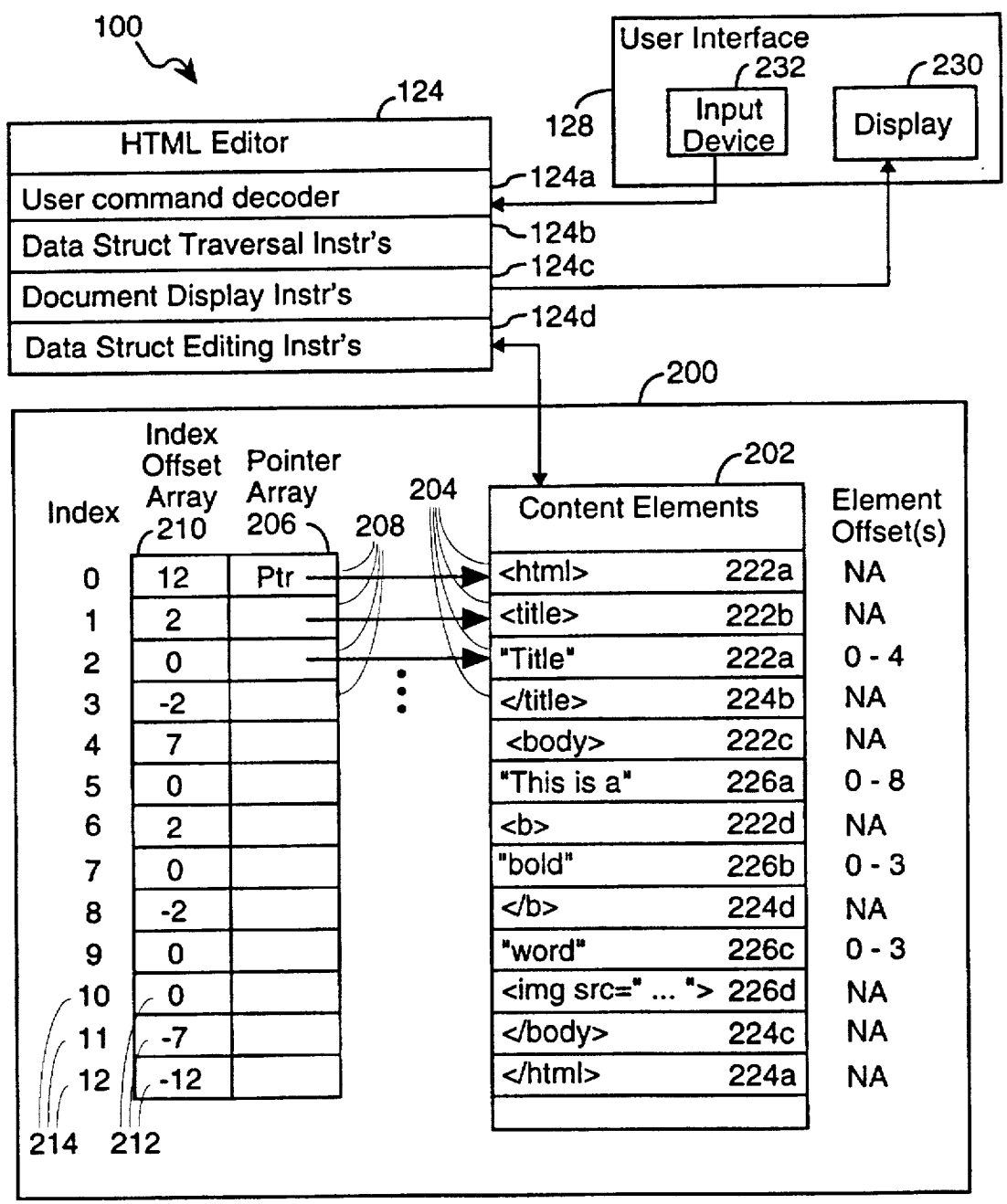
FIG. 2 is a block diagram of a hierarchical HTML document generated and edited by the hierarchical document editor.

FIG. 2 shows a functional block diagram of the HTML document editor 124 in creating and editing a data structure 200 representing the hierarchical HTML document. As will be described in more detail below, the HTML document editor 124 includes a user command decoder 124a, data structure traversal instructions 124b, document displaying instructions 124c for displaying the document on the user interface display 230, and data structure editing instructions 124d.

Referring to FIG. 2, the data structure 200 is stored in the memory 134 (see FIG. 1) by the HTML document editor 124. The hierarchical document data structure 200 includes: a first "document content" array 202 of variable length content elements 204, an array 206 of pointers 208 to the variable length content elements 204, and an array 210 of index offsets 212 whose purpose will be explained in more detail below. Each content element 204 has a corresponding unique index 214 associated with it.

The document content array 202 includes starttag items 222, matching endtag items 224, and leaf items 226 that make up the nested components of the HTML document 142. Each nested component is identified by a starttag item and a corresponding endtag item. The starttag items represent conventional HTML starttags, such as <html>, <title>, <body>, <b>, etc. Similarly, the endtag items represent conventional HTML endtags, such as </html>, </title>, </body>, </b>, etc. Moreover, the leaf items represent typical HTML leaf contents, such as text strings or conventional HTML single tags. A typical HTML single tag is <img src=" . . . ">.

Unlike in conventional data structures representing HTML documents, the HTML document 125 is represented linearly by the data structure 200. Specifically, each of the starttag, endtag, and leaf items 222, 224, and 226 of the data structure have a corresponding index 214 and a corresponding index offset 212. For the starttag items, the index offset is positive and has a value that offsets it from the matching endtag element. The endtag items have an index offset that is negative and has a value that offsets it from the matching starttag element. And, index offset for the leaf items is zero.

Each sub-element of a content element 204 has a position in the data structure 200 represented by the corresponding index 214 to the content element and a sub-element offset into the content element. The sub-element offset represents the sub-element's position relative to the beginning of its respective content element.

The efficiency of the linear data structure 200 of the present invention can be seen by considering what tasks the document editor must perform to locate the first "content" after the title of the document represented by this data structure. Using the linear data structure, the editor traverses the pointer array 206 one item at a time, and looks at each content element until it locates the <title> element, which happens to be at index "1" in the example shown in FIG. 2. It then looks up the corresponding index offset that indicates the end of the document's title. The index offset for the <title> element is equal to "2." As a result, the document editor skips down two items in the pointer array 206, plus one additional item to locate the first element in the document after the title. Thus, the document editor skips down to index item 4 (i.e., three index positions down from the index position for the beginning of the <title> element) in the pointer array 206 to access the first element of the document after the title.

By way of contrast, using a prior art document data structure, the editor would have had to search every element of the document until it found the end of the title element in order to locate the first content element after the title. Thus, use the present invention enabled the document editor to avoid inspecting the contents of the document title while it searched for the first content element after the title.

The HTML document editor 124 displays the HTML document 125 represented by the data structure 200 on a display (e.g., monitor) 230 of the user interface 128. In other words, the HTML document editor displays on the display 230 the contents of the HTML document represented by the starttag, endtag, and leaf content items 222, 224, and 226 in the data structure 200.

In editing (including creating) the HTML document 125, the user issues commands with the input device (e.g., keyboard or mouse) 232 of the user interface 128 to edit the HTML document. The HTML document editor 124 edits the HTML document according to the issued commands. In doing so, the HTML document editor 124 generates positions in the data structure 200 identified by index 214 and element offset for performing the editing operations on the data structure. This may include positions for inserting and deleting tags (i.e., starttag, endtag, or single tag) or text, positions defining ranges of text and/or tags to be selected and moved or deleted, etc.

For example, in response to commands for inserting or deleting a tag or text between the letters "l" and "d" in the word "bold" of the HTML document, the HTML document editor 124 generates a position at index 7, element offset 3, at which the tag or text may then be inserted or deleted. Similarly, in response to commands for selecting the text "This is a" in the body of the HTML document 125 and moving it to the title of the HTML document before the word "Title", the HTML document editor generates positions at index 5, element offset 0, and index 5, element offset 8, defining the range of the text to be moved and a position at index 2, element offset 0, at which the selected text is to be moved.

In performing editing operations like those just described, the HTML document editor 124 traverses the data structure 200. Depending on the particular editing operation being performed, the HTML document editor may do so to locate identified positions, to locate specific items, and/or determine the text characteristics (i.e., font type, bold, underline, etc.) at an identified position based on starttag and endtag items it encounters.

In traversing the document for the purposes just described, in many situations it is not necessary for the HTML document editor to traverse the contents of leaf items 206. Thus, when traversing forward over a leaf item, the HTML document editor moves forward from a previous index$_p$ of a starttag item to a next index$_n$ of a starttag item or leaf item by computing the next index$_n$ as index$_n$=index$_p$+offset$_p$+1. Similarly, the HTML document editor moves backward from a previous a previous index$_p$ of an endtag item to a next index$_n$ of an endtag item or leaf item by computing the next index$_n$ as index$_n$=index$_p$+offset$_p$−1.

For example, in the example given earlier for inserting a tag or text at index 7, element offset 3, the starting position in the data structure 200 may be at index 0, element offset 0. In this case, the HTML document editor 124 traverses the data structure in a forward direction to locate the position and to identify the text characteristics at that position. In doing so, the HTML document editor first computes the next index by incrementing the starting index from 0 to 1. Then using the index offset 2 at index 1, the HTML document editor computes the next index 4 by adding together the previous index 1, the index offset 2, and 1. The HTML document editor than increments the previous index 4 to compute the next index 5. The HTML document editor does this again in computing the next index 6. At this point, the HTML document editor determines that the text in the leaf item nested between the <b> starttag and its matching </b> endtag will be bold. Then, the HTML document editor increments the previous index 6 to compute the next index 7 and locates the position at index 7, element offset 4. If the editing operation is an insertion of text at the position at index 7, element offset 3, the HTML document editor 124 inserts the text at this position. Moreover, since the HTML document editor has determined that text inserted at this position is to be in bold, it then formats the inserted text so that it is displayed in bold on the display 230.

Moreover, the HTML document editor 124 updates the pointer array 206 and index offset array 210 whenever content elements are added to or deleted from the data structure 200 by an editing operation. In doing this, the HTML document editor traverses the data structure in the manner just described so that the contents of leaf items are skipped. Editing operations that only modify a leaf item 206 are indicated by corresponding changes to the respective content element 204, but do not require any changes to the pointer array 206 and index offset array 210.

The present invention can be used with a variety of hierarchical document data structures other than the HTML document data structure used in the preferred embodiment. However, in general, the hierarchical document data structures used in conjunction with the present invention will store item offset values to allow a hierarchical document editor to skip items and nested sets of items in a document while traversing the document data structure, without having to inspect the contents of the skipped items.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the editing technique and system described hereinabove is amenable for execution on various types of executable mediums other than a random access memory. Other types of executable mediums can be used, such as but not limited to, a computer readable storage medium which can be a memory device, compact disc, or floppy disk.

What is claimed is:

1. A computer system for editing a document, the computer system comprising:

a memory to store a data structure representing the document as a hierarchical document, the hierarchical document comprising starttags and endtags and leaf contents between ones of the starttags and endtags, the data structure including an array of items, each of the items representing a corresponding one of the starttags, endtags, and leaf contents; each of the items having a corresponding index associated therewith, said data structure further including an index offset for each of the starttag and endtag items, each said index offset indicating an offset to a corresponding complementary starttag or endtag item in said hierarchical document;

a user interface to display the hierarchical document and to issue commands for editing the hierarchical document; and a hierarchical document editor to edit the hierarchical document in response to the issued commands, said hierarchical document editor including instructions for traversing the data structure, both forward and backward, using said index offsets to skip over ones of said items in the data structure without having to inspect the contents of the skipped items.

2. The computer system of claim 1, said data structure further including an array of pointers, each pointer linking one of the items of the data structure to the corresponding index associated therewith; and said hierarchical document editor further including instructions for traversing the data structure using said array of pointers to access the contents of the items.

3. The computer system of claim 1, a communications link to receive the document and the hierarchical document editor from a remote computer connected to the computer system.

4. The computer system of claim 1, a communications link to transmit the document and the hierarchical document editor to a remote computer connected to the computer system.

5. A method for editing a document in a computer system, the steps of the method comprising:

storing in a memory a data structure representing the document as a hierarchical document, the hierarchical document comprising starttags and endtags and leaf contents between ones of the starttags and endtags, the data structure including an array of items, each of the items representing a corresponding one of the starttags, endtags, and leaf contents; each of the items having a corresponding index associated therewith, said data structure further including an index offset for each of the starttag and endtag items, each said index offset indicating an offset to a corresponding complementary starttag or endtag item in said hierarchical document;

displaying the hierarchical document and issuing commands for editing the hierarchical document; and editing the hierarchical document in response to the issued commands, including traversing the data structure, both forward and backward, using said index offsets to skip over ones of said items in the data structure without having to inspect the contents of the skipped items.

6. The method of claim 5, wherein the data structure further comprises an array of pointers, each pointer linking one of the items to the corresponding index associated therewith; and wherein the step of editing the hierarchical document further comprises the step of traversing the data structure using said array of pointers to access the contents of the items.

7. The method of claim 5, prior to said storing step, receiving the document from a remote computer in communication with the computer system.

8. A computer program product for use in conjunction with a computer system, the computer system including a user interface to display a document and issue commands to edit the document, the computer program product comprising a computer readable storage medium and a computer program mechanism embedded therein, the computer program mechanism comprising:

a data structure representing the document as a hierarchical document, the hierarchical document comprising starttags and endtags and leaf contents between ones of the starttags and endtags, the data structure including an array of items, each of the items representing a corresponding one of the starttags, endtags, and leaf contents; each of the items having a corresponding index associated therewith, said data structure further including a index offset for each of the starttag and endtag items, each said index offset indicating an offset to a corresponding complementary starttag or endtag item in said hierarchical document; and a document editor, executable by the computer system, for editing the hierarchical document in response to the issued commands, the document editor including instructions for traversing the data structure, both forward and backward, using said index offsets to skip over ones of said items in the data structure without having to inspect the contents of the skipped items.

9. The computer program product of claim 8, the data structure further including an array of pointers, each pointer linking one of the items to the corresponding index associated therewith; and the document editor further including instructions for traversing the data structure using said array of pointers to access the contents of the items.

10. The computer program product of claim 8, wherein the computer system further comprises a communication link to communicate with at least one client computer; and a server process, executable by the computer system, for transmitting the document and the document editor to the client computer.

11. The computer program product of claim 8, wherein the computer system further comprising a communication link to communicate with at least one server computer; and a client process, executable by the computer system, for receiving the document and the document editor from the server computer.

12. A method for editing a hierarchical document in a computer system, said computer system connected to at least one remote data processing system by a communication link, said remote data processing system including a storage medium for storing a plurality of hierarchical documents and a document editor for editing the hierarchical documents, said method comprising the steps of:

retrieving the hierarchical document and the document editor from the remote data processing system, said hierarchical document comprising starttags, endtags, and leaf items, each starttag being paired with a matching endtag, the leaf items occurring between ones of the starttags and endtags;

establishing a data structure in a memory device to represent the hierarchical document, the data structure comprising a table of elements and an indexing table, each element corresponding to one of the starttags, endtags, and leaf items, the indexing table having a plurality of indices and index offsets, each index and index offset associated with one of the elements, each index offset indicating an offset to the respective matching starttag and endtag, said index offset used for accessing matching elements of the data structure without accessing elements in between; and utilizing the data structure to edit elements of the data structure by accessing the edited elements using the associated index offsets.

13. A method as in claim 12, wherein the indexing table further comprises a plurality of pointers, each pointer associating one of the elements to one of the indices; and wherein said step of utilizing the data structure to edit elements further includes the step of accessing the edited elements by using the pointers.

14. A method of distributing a document in a data processing system, said data processing system comprising a network of computer systems including at least one client computer system, said method comprising the steps of:

transmitting the document to the client computer system, the document represented as a hierarchical document by a data structure stored in a memory device of the client computer system, the hierarchical document comprising starttags and endtags and leaf contents between ones of the starttags and endtags, the data structure including an array of items, each of the items representing a corresponding one of the starttags, endtags, and leaf contents, each of the items having a corresponding index associate therewith, said data structure further including an index offset for each of the starttag and endtag items, each of said index offset indicating an offset to a corresponding complementary starttag or endtag item in said hierarchical document; and transmitting a document editor, for use in editing the hierarchical document, to the client computer system, the document editor traversing the data structure, both forward and backward, using said index offsets to skip over ones of said items in the data structure without having to inspect the contents of the skipped items.

15. The method of claim 14, wherein the data structure further comprises an array of pointers, each pointer linking one of the items to the corresponding index associated therewith; and wherein the document editor traverses the data structure using said array of pointers to access the contents of the items.

* * * * *